J. T. ANDREW.
SAFETY APPLIANCE FOR RAILWAYS.
APPLICATION FILED NOV. 18, 1910.
985,650.
Patented Feb. 28, 1911.
2 SHEETS—SHEET 1.
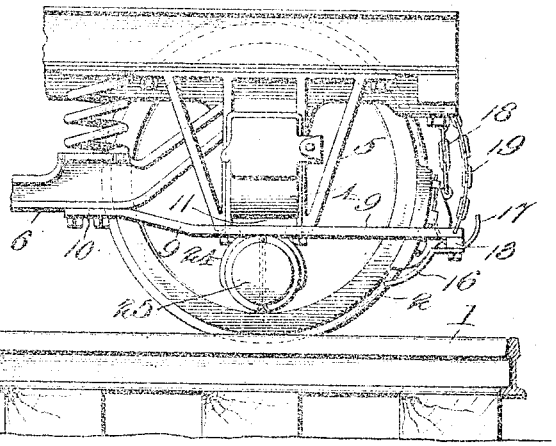
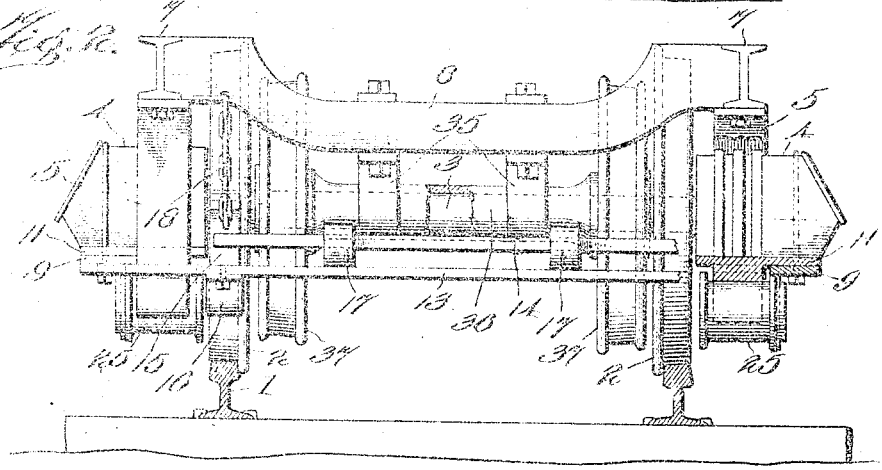
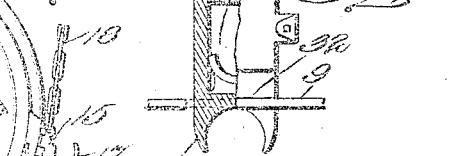

J. T. ANDREW.
SAFETY APPLIANCE FOR RAILWAYS.
APPLICATION FILED NOV. 18, 1910.
985,650.
Patented Feb. 28, 1911.
2 SHEETS—SHEET 2.
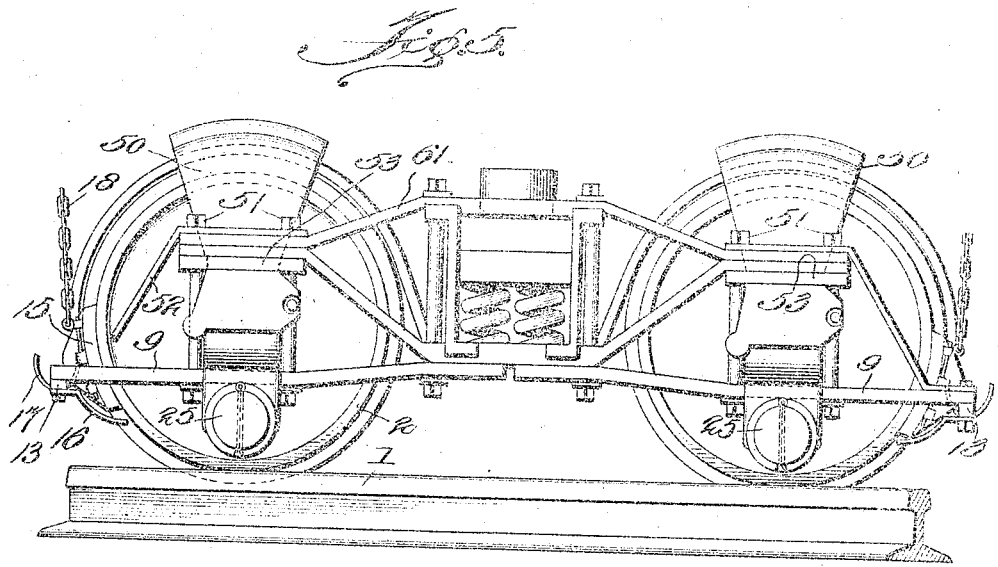
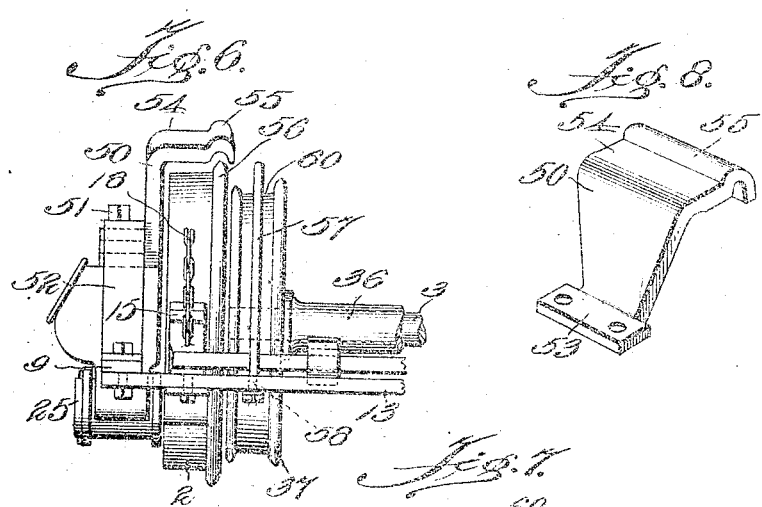

UNITED STATES PATENT OFFICE.

JAMES T. ANDREW, OF MONTGOMERY, ALABAMA.

SAFETY APPLIANCE FOR RAILWAYS.

985,650.  Specification of Letters Patent.  Patented Feb. 28, 1911.

Application filed November 18, 1910. Serial No. 593,094.

*To all whom it may concern:*

Be it known that I, JAMES T. ANDREW, a citizen of the United States, residing at Montgomery, in the county of Montgomery and State of Alabama, have invented certain new and useful Improvements in Safety Appliances for Railways; and I do hereby declare the following to be a full, clear, and exact description of the invention, such as will enable others skilled in the art to which it appertains to make and use the same.

This invention relates to safety railway appliances, and has for its object to improve the appliances heretofore invented by me, and especially those such as are disclosed in my prior Patent #897,864, issued September 8, 1908.

With these ends in view, the invention consists in the details of construction and combinations of parts more fully hereinafter disclosed and particularly pointed out in the claims.

Referring to the accompanying drawings forming a part of this specification, in which like numerals refer to like parts in all the views:—Figure 1 is a fragmentary view in side elevation of a portion of a passenger truck with my improvements applied thereto; Fig. 2 is an end elevational view of the parts shown in Fig. 1; Fig. 3 is a view similar to Fig. 1, but showing my improvements applied to a freight truck instead of a passenger truck; Fig. 4 is a view partly in section of a modified form of box and safety roller support; Fig. 5 is a side elevational view showing a further modified form of safety device applied to a truck; Fig. 6 is an end elevational view of a portion of the truck shown in Fig. 5; Fig. 7 is a sectional view of certain of the parts shown in Fig. 6 and illustrating the safety device applied to the safety wheel; and Fig. 8 is a perspective view of the safety journal plate detached from the truck.

1 indicates the track, 2 the wheels of the truck, 3 the axle on which said wheels are mounted, 4 the journal box, 5 the pedestals adapted to move up and down relatively to the boxes 4, 6 the equalizer beams, 7 the longitudinal beams, and 8 the transverse beams of my truck.

9 represents a safety frame bolted as at 10 to the equalizer beams 6, and passing under the projecting bottom 11 of the boxes 4, as shown in Figs. 1 and 2. The pedestals 5, as best shown in Fig. 2, pass between the frame 9 and the wheels, so that they are free to move up and down regardless of said frame. The said frame 9 in this invention is extended entirely across the face of the wheel 2 and beyond the same, as shown in Figs. 1 and 3, and at their ends opposite to that of the ends 10 is secured a transverse safety tie rod or bar 13, which extends parallel to the axle 3 and is secured on the other side of the truck to a similar bar or frame 9, as will be readily understood. The rod or bar 13 is located below and substantially parallel with the brake beam 14, and carries immediately beneath the brake shoes 15 the curved safety pieces 16 adapted to catch the said brake shoes should they become accidentally detached, and thereby prevent the same from falling between the wheels and track and causing a derailment. Said bar 13 also carries curved safety pieces 17, as best shown in Fig. 2, which are located immediately below the brake beam 14, and are so curved as to enable the same to catch said beam should it become accidentally detached, and thereby prevent the same from falling in the way of the wheels and consequently causing a derailment.

18 represents the chains for holding the brake beams and shoes in their proper position, and 19 represents chains for holding the safety frame 9 and its coacting parts in proper position should any of said parts break. These chains 19 are omitted for the sake of clearness in Fig. 2.

In the form of truck shown in Fig. 3, the pedestals are omitted, and the safety frame 9 passes directly through the casting 24 supporting the safety rollers 25, as will be readily understood. In both Figs. 1 and 3, the brake beam is likewise omitted for the sake of clearness.

In the modified form of journal box 30, shown in Fig. 4, the said box and safety roller bearings 31 are made integral, and the safety frame 9 passes underneath a projecting ledge 32 cast upon said box, and precisely similar to the ledge 11 shown in Fig. 2. This particular form of box and roller bearings is exceedingly strong, in that there are no parts to be bolted together, and it is likewise very cheap and simple to construct, for that it is readily made in a single casting.

In addition to the above, the transverse beam 8 is provided with safety sleeve supports 35 which are secured to said beam 8 and pass down under and around the safety sleeve 36 encircling the axle 3, and on which the inner safety wheels 37 are mounted, as in my patent above.

Referring more particularly to the modified form of invention illustrated in Figs. 5, 6, 7 and 8, I attach directly to the truck immediately above the journal box, a safety journal plate 50 which may be secured by the bolts 51 passing through the truck on each side of the journal box, as shown, or by any other suitable means. I preferably add in this instance also a strengthening arch bar 52, which passes above the flange 53 of the safety journal plate, and also passes down to the safety frame 9 disclosed above, to which it may be secured in any suitable manner. The safety journal plate 50 is bent as shown at 54 to pass over the tread of the wheel 2, and it may be provided, if desired, with a grooved portion 55, which will fit the flange 56 of said wheel 2. In its normal position, the bent portion 54 rests a short distance above the tread of the wheel 2, but when a journal breaks upon the outside, naturally the whole truck will fall, and said parts 54 and 55 will firmly rest upon the tread of the wheel and its flange 56, thereby supporting the structure, and preventing the same from falling to the road bed until the air brakes are applied, and thereby averting what might otherwise be a serious wreck by a broken journal. As best shown in Figs. 6 and 7, I may likewise attach to the tie rod 13 as at 58, a safety strap or bar 57 which passes over and partially encircles the safety wheel 37, and is secured to the lower center bolster 59 of the truck. This safety strap 57 is likewise normally located a short distance above the tread 60 of the safety wheel 37, and should an equalizer beam, or an arch bar such as 61, or a journal break, naturally the truck would drop, but in that event the said strap 57 would catch upon the tread 60 of the safety wheel 37 and the whole structure would be held up until the air brakes are applied, and thereby avoid what would otherwise be a serious wreck.

The operation of my improved safety appliance is as follows:—Should an axle such as 3 break between the wheels, the safety sleeve 36 will still accommodate the ends of the broken axle, and the tie rod 13 together with the safety frames 9 will hold the boxes 4 firmly against the outer faces of the wheels 2 from spreading and consequently hold the ends of the broken axle within said sleeve 36. It results, therefore, that in case of an axle breaking between the wheels, that the car will not leave the track, and will still go on a considerable distance with perfect safety until the train is stopped. Should the axle break outside of the wheels, then the weight of the truck or load will cause the transverse beams 8 to descend thereby causing the safety supports 35 to rest upon the safety sleeve 36, and this sleeve in turn will transfer the strain back to the wheels 2, which are firmly on the track. In the case of a loose wheel, such as 2, the inner ends of the boxes will be held firmly by the tie rod 13 against the outer faces of said wheels, and thereby prevent the said wheels from spreading outwardly. The safety wheels 37 in the same way will prevent said wheels from coming together inwardly. In either case, the standard gage is still maintained and consequently my improvements insure against derailments from loose wheels.

Since the tie rods 13 extend from one side of the truck to the other, and since the safety frames 9 are so firmly secured to the coacting parts of the truck, my said tie rods serve to solidify or strengthen the entire truck as a whole. They further serve to prevent the pedestals 5 from swinging outward in case of derailment, in that the said pedestals pass just inside of said rods 9. In addition to the above, should the wheel 2 leave the track, it naturally produces a twisting action upon the jaws of the pedestals 5, and since the safety frames 9 fit outside of said pedestals, this twisting motion due to a derailment or to other causes is effectually resisted. Further, the catches 16 and 17 carried by the tie rod 13 effectually prevent the brake shoes 15 or the brake beams 14 from falling in front of the wheels, and thereby causing a derailment. Again, in the building of new trucks, I am enabled by the construction shown in Fig. 4, to do away with the necessity of bolting the roller framing to the journal box, and am enabled to supply a cheaper and stronger construction of combined journal boxes and safety roller bearings than has been heretofore possible. In addition to the above, the safety devices best shown in Figs. 5 to 8 enable the entire framework of the truck to be held up in the case of a breakage of a part. This holding up of the frame-work of the truck, is also accompanied by gripping of the wheel 2 by the plate 50, which effectually prevents said wheel from sluing to one side in the case of the breakage of any part which would lay the frame-work of the truck down, and this prevention of the sidewise movement of the wheel of course, serves to keep the same on the track and to thereby avoid dangerous wrecks which would otherwise readily occur. Particularly does the safety strap 57 prevent the letting down of the center bolster 59, in the case of the breakage of any of the arch bars such as 61 and it thereby effectually guards against this common form of wrecks.

Of course, the wheels are equipped alike on both sides of the truck.

It will be understood that in all cases of the breakage of a portion of the truck, I provide suitable means for automatically applying the brakes and stopping the train, one example of such means being disclosed in my patent above.

It is evident that those skilled in the art may vary the details of construction and the arrangement of parts without departing from the spirit of my invention, and therefore, I do not wish to be limited to such features as disclosed, except as may be required by the claims.

What I claim is:—

1. In a railway safety appliance the combination of a truck; safety frames secured thereto and passing across the wheels on each side thereof; a brake beam located transversely of said truck; and a tie member also passing transversely of said truck secured to said safety frames, and having means adapted to catch said beam in case it becomes accidentally detached from said truck, substantially as described.

2. In a railway safety appliance the combination of a truck; safety frames secured thereto and passing across the wheels on each side thereof; a connection between said safety frames and the journal boxes of said truck; a brake beam extending transversely of said truck; and a tie member also passing transversely of said truck secured to said safety frames and carrying curved plates adapted to prevent said beam from falling to the rails in case of accident, substantially as described.

3. In a railway safety appliance the combination of a truck provided with equalizer beams, and journal boxes; the combination of safety frames secured at one end of said equalizer beams and passing across said journal boxes, and the wheels of said truck on each side thereof; a brake beam located transversely of said truck; and a tie rod also passing transversely of said truck secured to the other end of said frames, and having means to catch said beam in case of its accidental detachment from said truck, substantially as described.

4. In a railway safety appliance the combination of a truck provided with equalizer beams and journal boxes, an axle and a safety sleeve surrounding said axle; the combination of safety frames secured at one end of said equalizer beams and passing across said wheels and under said journal boxes of said truck on each side thereof; and a tie rod passing transversely of said truck secured to the other end of said frames, thereby securing said parts together, substantially as described.

5. In a railway safety appliance the combination of a truck provided with a brake beam and brake shoes; safety frames secured to said truck on each side of and passing across the journal boxes and wheels of the truck; a tie rod secured to said frames extending across said truck; and means carried by said rod for holding said shoes should they become accidentally detached and thereby preventing the same from obstructing the wheels, substantially as described.

6. In a railway safety appliance the combination of a truck provided with a brake beam and brake shoes; safety frames secured to said truck on each side of and passing across the journal boxes and wheels of the truck; pedestals adapted to move up and down between said safety frames and the wheels of said truck; a tie rod secured to said frames extending across said truck; and means carried by said rod for holding said shoes and beams should they become accidentally detached and thereby preventing the same from obstructing the wheels, substantially as described.

7. In a railway safety appliance the combination of a truck provided with wheels; an axle joining said wheels; a safety sleeve surrounding said axle; a transverse beam and safety connections between said beam and said sleeve; journal boxes for said axle; safety frames on each side of said truck, extending under said journal boxes and across said wheels; and a tie rod extending across said truck and joining said safety frames, substantially as described.

8. In a railway safety appliance the combination of a truck provided with wheels; and axle joining said wheels; a safety sleeve surrounding said axle; a transverse beam and safety connections between said beam and said sleeve; journal boxes for said axle; pedestals adapted to move up and down relatively to said boxes; safety frames on each side of said truck extending under said journal boxes and across said wheels; brake shoes for said wheels; a brake beam supporting said shoes; and a tie rod carrying means to catch said beam and shoes in case of accident extending across said truck and joining said safety frames, substantially as described.

9. In a railway safety appliance the combination of a truck provided with a safety wheel and a curved safety strap located above and encircling said wheel and secured to said truck, whereby said truck may be supported by said strap and wheel in case of accident, substantially as described.

10. In a railway safety appliance the combination of a truck provided with an ordinary wheel and with a safety wheel; a safety plate secured to said truck and extending above said wheel; and a safety strap also secured to said truck and extending above said safety wheel, whereby said plate and strap will support said truck in case of accident, substantially as described.

11. In a railway safety appliance the combination of a truck; a safety frame secured thereto; a tie rod secured to said frame; a safety wheel associated with said truck; a safety strap secured to said tie rod and passing over said safety wheel; and a central bolster to which said strap is also secured, substantially as described.

12. In a railway safety appliance the combination of a truck; a safety frame secured thereto; a journal box under which said frame passes; a tie rod secured to said frame; a safety wheel associated with said truck; a safety sleeve on which said wheel is mounted; a safety strap secured to said tie rod and passing over said safety wheel; and a central bolster to which said strap is also secured, substantially as described.

In testimony whereof, I affix my signature, in presence of two witnesses.

JAMES T. ANDREW.

Witnesses:
T. A. WITHERSPOON,
R. M. PARKER.